US011201378B2

(12) United States Patent
Huynh et al.

(10) Patent No.: US 11,201,378 B2
(45) Date of Patent: Dec. 14, 2021

(54) BATTERY MONITOR PROTECTION

(71) Applicant: Faraday&Future Inc., Gardena, CA (US)

(72) Inventors: Long Phi Huynh, West Covina, CA (US); Michael Hong, Irvine, CA (US); Anthony Sansone, Burbank, CA (US)

(73) Assignee: Faraday & Future Inc., Gardena, CA (US)

( * ) Notice: Subject to any disclaimer, the term of this patent is extended or adjusted under 35 U.S.C. 154(b) by 281 days.

(21) Appl. No.: 16/099,645

(22) PCT Filed: May 17, 2017

(86) PCT No.: PCT/US2017/033184
§ 371 (c)(1),
(2) Date: Nov. 7, 2018

(87) PCT Pub. No.: WO2017/201208
PCT Pub. Date: Nov. 23, 2017

(65) Prior Publication Data
US 2019/0152333 A1   May 23, 2019

Related U.S. Application Data

(60) Provisional application No. 62/337,790, filed on May 17, 2016.

(51) Int. Cl.
*H01M 50/502* (2021.01)
*H01M 10/42* (2006.01)
*H01M 10/48* (2006.01)
*B60L 50/60* (2019.01)

(52) U.S. Cl.
CPC .......... *H01M 50/502* (2021.01); *B60L 50/60* (2019.02); *H01M 10/425* (2013.01);
(Continued)

(58) Field of Classification Search
CPC ... G01R 31/396; G01R 31/382; H01M 2/206; H01M 10/425; H01M 10/482;
(Continued)

(56) References Cited

U.S. PATENT DOCUMENTS

2008/0278115 A1\* 11/2008 Huggins ............. H01M 10/615
320/134
2009/0284076 A1   11/2009 Lin et al.
(Continued)

FOREIGN PATENT DOCUMENTS

KR   10-2011-0118766 A   11/2011

OTHER PUBLICATIONS

International Search Report dated Oct. 13, 2017 for International Application No. PCT/US2017/033184.

*Primary Examiner* — Daniel R Miller
*Assistant Examiner* — Christian T Bryant
(74) *Attorney, Agent, or Firm* — Knobbe Martens Olson & Bear, LLP

(57) ABSTRACT

A battery system of an electric vehicle is disclosed. The battery system can include at least a first battery string including a number of battery modules, wherein the first battery string has an output that is coupled to the first power bus through a string switch, and wherein each of battery modules includes a plurality of battery cells connected in series. The battery system can also include a number of battery module monitors, wherein each of the battery module monitors is coupled to the battery cells of a corresponding one of the battery modules. The battery system can further include module monitor protection circuitry coupled to each of the battery module monitors, wherein the module monitor protection circuitry includes a plurality of protection circuits.

13 Claims, 6 Drawing Sheets

(52) U.S. Cl.
CPC ........... *H01M 10/482* (2013.01); *Y02E 60/10* (2013.01); *Y02T 10/70* (2013.01)

(58) Field of Classification Search
CPC ..... H01M 10/4207; H01M 2010/4278; H01M 2010/4271; Y02E 60/10; H04Q 2209/75; H04Q 2209/80; H04Q 2209/86; H04Q 9/00; G08C 17/02; B60L 50/60; Y02T 10/70

See application file for complete search history.

(56) References Cited

U.S. PATENT DOCUMENTS

| | | | |
|---|---|---|---|
| 2010/0157495 A1* | 6/2010 | Densham | H02H 9/041 361/56 |
| 2011/0181246 A1* | 7/2011 | Tae | H02J 7/0014 320/118 |
| 2011/0267726 A1* | 11/2011 | Ikeuchi | H01M 10/48 361/63 |
| 2012/0064378 A1* | 3/2012 | Wang | H01M 2/34 429/7 |
| 2012/0162828 A1* | 6/2012 | Holsen | H02J 7/00036 361/1 |
| 2013/0293995 A1 | 11/2013 | Brown et al. | |
| 2013/0320932 A1* | 12/2013 | Zhou | H02J 7/00 320/136 |
| 2014/0320070 A1* | 10/2014 | Nakamoto | H02J 7/0068 320/107 |
| 2014/0327400 A1* | 11/2014 | Kudo | B60L 50/51 320/118 |

* cited by examiner

BATTERY MONITOR PROTECTION

CROSS-REFERENCE TO RELATED APPLICATIONS

This application is a National Phase application under 35 U.S.C. § 371 of International Application No. PCT/US2017/033184, filed May 17, 2017, which claims the benefit of U.S. Provisional Application No. 62/337,790, filed May 17, 2016, the entirety of each of which is hereby incorporated by reference.

BACKGROUND

Field

The described technology generally relates to batteries, more specifically, to battery monitoring systems.

BRIEF DESCRIPTION OF THE DRAWINGS

These drawings and the associated description herein are provided to illustrate specific embodiments of the invention and are not intended to be limiting.

DETAILED DESCRIPTION

Figure 1:
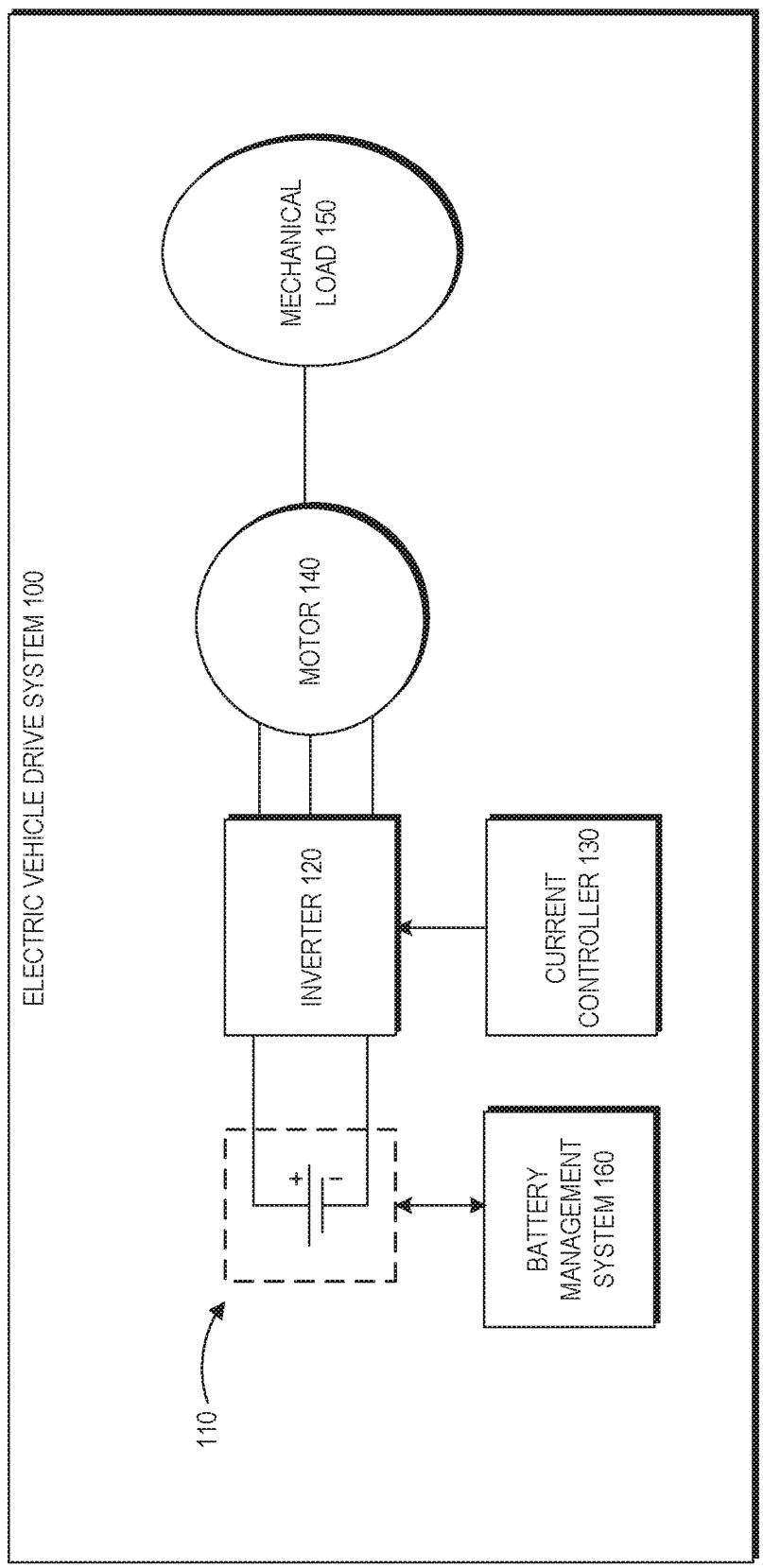
FIG. 1 is a block diagram of an example electric vehicle drive system according to one embodiment.

Various aspects of the novel systems, apparatuses, and methods are described more fully hereinafter with reference to the accompanying drawings. Aspects of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of or combined with any other aspect. For example, an apparatus may be implemented or a method may be practiced using any number of the aspects set forth herein. In addition, the scope is intended to encompass such an apparatus or method which is practiced using other structure, functionality, or structure and functionality in addition to or other than the various aspects set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to automotive systems and/or different wired and wireless technologies, system configurations, networks, including optical networks, hard disks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

FIG. 1 is a block diagram of an example electric vehicle drive system 100. The electric vehicle drive system 100 includes a battery or voltage source 110, an inverter 120 coupled to the battery 110, a current controller 130, a motor 140, and mechanical load 150, and a battery management system 160. The battery 110 can be a single phase direct current (DC) source. In some embodiments, the battery 110 can be a rechargeable electric vehicle battery or traction battery used to power the propulsion of an electric vehicle including the drive system 100. Although the battery 110 is illustrated as a single element in FIG. 1, the battery 110 depicted in FIG. 1 is only representational, and further details of the battery 110 are discussed below in connection with FIGS. 2-6.

The inverter 120 includes power inputs which are connected to conductors of the battery 110 to receive, for example, DC power, single-phase electrical current, or multi-phase electrical current. Additionally, the inverter 120 includes an input which is coupled to an output of the current controller 130. The illustrated inverter 120 also includes three outputs representing three phases with currents that can be separated by 120 electrical degrees, with each phase provided on a conductor coupled to the motor 140. It should be noted that in other embodiments inverter 120 may produce greater or fewer than three phases.

The motor 140 is fed from voltage source inverter 120 controlled by the current controller 130. The inputs of the motor 140 are coupled to respective windings distributed about a stator. The motor 140 can be coupled to a mechanical output, for example a mechanical coupling between the motor 140 and the mechanical load 150. Mechanical load 150 may represent one or more wheels of the electric vehicle.

The current controller 130 can be used to generate gate signals for the inverter 120. Accordingly, control of vehicle speed is performed by regulating the voltage or the flow of current from the inverter 120 through the stator of the motor 140. There are many control schemes that can be used in the electric vehicle drive system 100 including current control, voltage control, and direct torque control. Selection of the characteristics of inverter 120 and selection of the control technique of the current controller 130 can determine efficacy of the drive system 100. The battery management system 160 can receive data from the battery 110 and generate control signals to manage the battery 110. Further details of the battery management system 160 are discussed in connection with FIGS. 2-3 below.

Although not illustrated, the electric vehicle drive system 100 can include one or more position sensors for determining position of the rotor of the motor 140 and providing this information to the current controller 130. For example, the motor 140 can include a signal output that can transmit a position of a rotor assembly of the motor 140 with respect to the stator assembly of the motor 140. The position sensor can be, for example, a Hall-effect sensor, a magnetoresistive sensor, potentiometer, linear variable differential transformer, optical encoder, or position resolver. In other embodiments, the saliency exhibited by the motor 140 can also allow for sensorless control applications. Although not illustrated, the electric vehicle drive system 100 can include one or more current sensors for determining phase currents of the stator windings and providing this information to the current controller 130. The current sensor can be, for example, a Hall-effect current sensor, a sense resistor connected to an amplifier, or a current clamp.

It should be appreciated that while the motor 140 is described as an electrical machine that can receive electrical power to produce mechanical power, it can also be used such that it receives mechanical power and thereby converts that to electrical power. In such a configuration, the inverter 120 can be utilized to excite the winding using a proper control and thereafter extract electrical power from the motor 140 while the motor 140 is receiving mechanical power.

Figure 2:
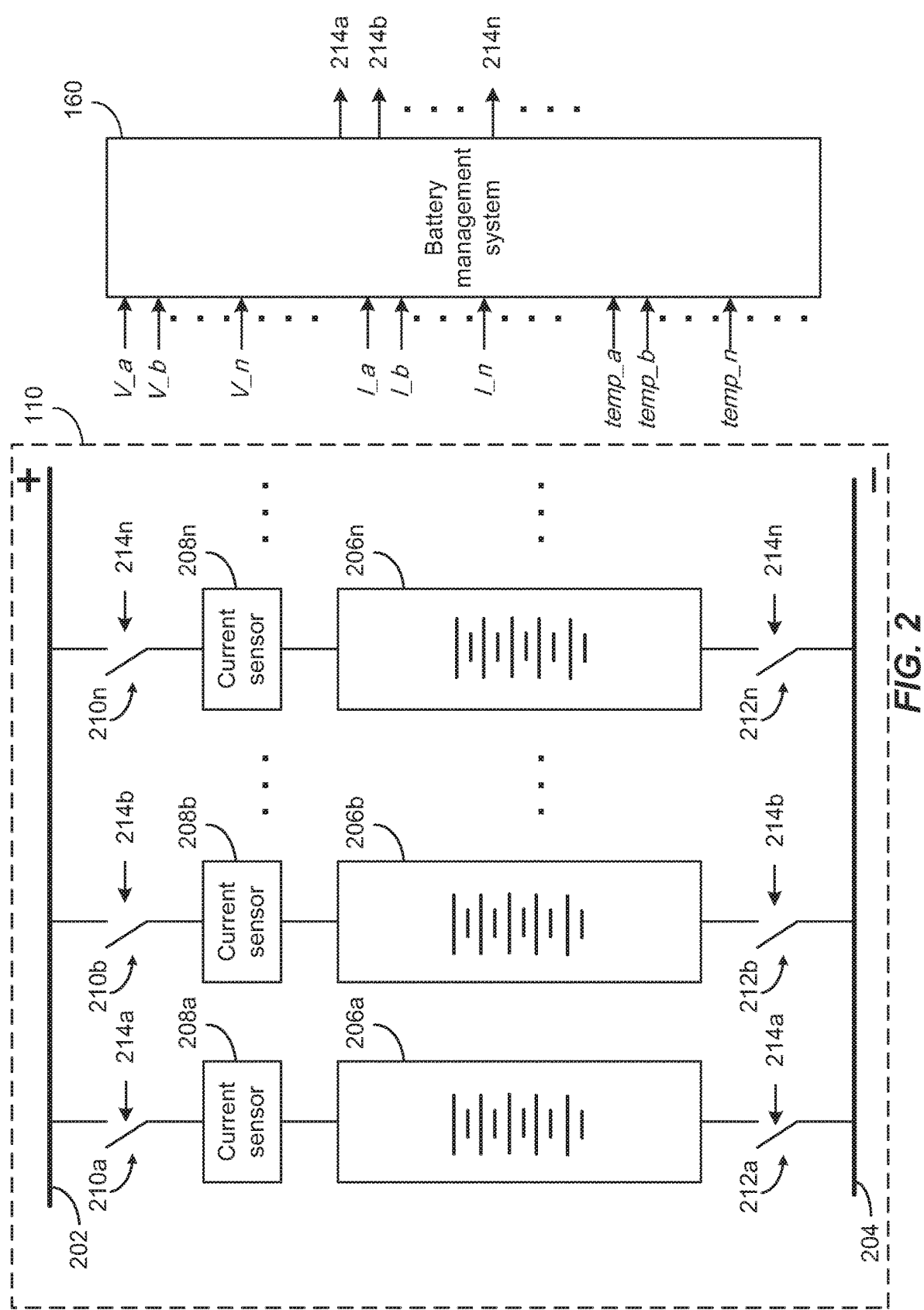
FIG. 2 is a block diagram of an example voltage source and battery management system according to one embodiment.

FIG. 2 is a block diagram of an example voltage source according to one embodiment. The voltage source 110 can include a plurality of battery strings 206a, 206b, . . . 206n, . . . , individually or collectively referred to herein as the battery string(s) 206, and a plurality of string current sensors 208a, 208b, . . . , 208n, . . . , individually or collectively referred to herein as the string current sensor(s) 208. The battery strings 206 can be individually connected to or disconnected from a positive or high power bus 202 and a negative or low power bus 204 through a plurality of string switches 210a, 210b, . . . , 210n, . . . , and 212a, 212b, . . . , 212n, . . . , individually or collectively called the string switches 210 and 212. The string switches 210 and 212 can be controlled by control signals from the battery management system 160. The battery management system 160 can receive, among others, voltages, V_a, V_b, . . . , V_n, . . . , which can be output voltages across the respective battery strings 206a, 206b, . . . , 206n, . . . , determined using, for example a plurality of sensors and/or amplifiers (not shown). The battery management system 160 can also receive currents, I_a, I_b, . . . , I_n, . . . , which are currents from the respective battery strings 206a, 206b, . . . , 206n, . . . , measured by the respective string current sensors 208a, 208b, . . . , 208n, . . . . The battery management system 160 also can receive temperature measurements, temp_a, temp_b, . . . , temp_n, . . . , which are one or more of temperature measurements from the respective battery strings 206a, 206b, . . . 206n, . . . , measured by one or more temperature sensors (not shown) accompanying the battery strings. Based at least in part on the voltages, V_a, V_b, . . . , V_n, . . . , currents, I_a, I_b, . . . , I_n, . . . , and/or temperatures, temp_a, temp_b, . . . , temp_n, . . . , of the respective battery strings 206, the battery management system 160 can generate control signals 214a, 214b, . . . , 214n, . . . , individually or collectively referred to herein as the control signal(s) 214, for controlling the respective switches 210 and 212. As further described below, in addition to or instead of voltage, current, and/or temperature data of the battery strings 206, the battery management system 160 may receive respective voltage, current, and/or temperature data of subsets or parts, such as modules, bricks, and/or cells, of each of the battery strings 206. Further details of the battery management system 160 are discussed below in connection with FIG. 3 below.

The battery strings 206 can include a plurality of modules, each of which in turn can include a plurality of bricks and/or cells. Within each battery string 206, the constituent modules, bricks, and/or cells can be connected in series as symbolically depicted in FIG. 2. In some embodiments, the battery or voltage source 110 can include six battery strings 206 that can be connected to or disconnected from the power buses 202, 204. In some embodiments, each of the battery strings 206 can include a plurality of battery modules connected in series, and further details of the subsets of the battery 110 are discussed in connection with FIGS. 3-6 below. The battery strings 206 and their subsets can be implemented with various different types of rechargeable batteries made of various materials, such as lead acid, nickel cadmium, lithium ion, or other suitable materials. In some embodiments, each of the battery strings can output about 375 V to 400 V if charged about 80% or more.

The string current sensors 208 can be connected in series with the respective battery strings 206 between the high and low power buses 202, 204. As shown in FIG. 2 the string current sensor 208 can be connected to the positive side of the respective battery strings 206 to measure the current discharged from the battery strings 206. In other embodiments, the string current sensors 208 can be connected to the battery strings 206 otherwise to measure the current flow due to discharging of the battery strings 206. The string current sensors 208, for example, can be implemented with any suitable current sensors, such as Hall-effect sensors and/or magnetoresistive sensors.

The string switches 210 and 212 can be contactors configured to connect the battery strings 206 to the power buses 202, 204 or disconnect the battery strings 206 from the power buses 202, 204 in response to the respective control signals 214. The switches 210 can be implemented with any suitable contactors capable of handling the level of current and voltage as needed in connection with, for example, the battery strings 206, the power buses 202, 204, and the mechanical load 150 (FIG. 1) within the electric vehicle drive system 100 (FIG. 1). In some embodiments the string switches 210 and 212 can be implemented with mechanical contactors with solenoid inside. In some embodiments, the string switches 210 can be powered by one or more drivers in the battery management system 160. Although in the illustrated example in FIG. 2, the string switches 210 (e.g., 210n) and the string switches 212 (e.g., 212n) are controlled by the same respective control signals 214 (e.g., 214n), in other embodiments, the string switches 210 (e.g., 210n) can be controlled by respective positive bus connect control signals while the string switches 212 (e.g., 212n) can be controlled by respective negative bus connect control signals.

The battery management system 160 can include a plurality of passive and/or active circuit elements, signal processing components, such as analog-to-digital converters (ADCs), amplifiers, buffers, drivers, regulators, or other suitable components. In some embodiments, the battery management system 160 can also include one or more processors to process incoming data to generate outputs, such as the control signals 214. In some embodiments, the battery management system 160 can also include one or more components for communicating and sending and receiving data within the battery management system 160 and/or with other components or circuitries in the electric vehicle. For example, the various components and circuits within the system 100, including components in the battery management system 160 can be in communication with one another using protocols or interfaces such as a controller area network (CAN) bus, serial peripheral interface (SPI), or other suitable protocols or interfaces. And in some embodiments, the processing of incoming data can be at least in part performed by other components not in the battery management system 160 within the electric vehicle as the battery management system 160 communicates with other components.

Figure 3:
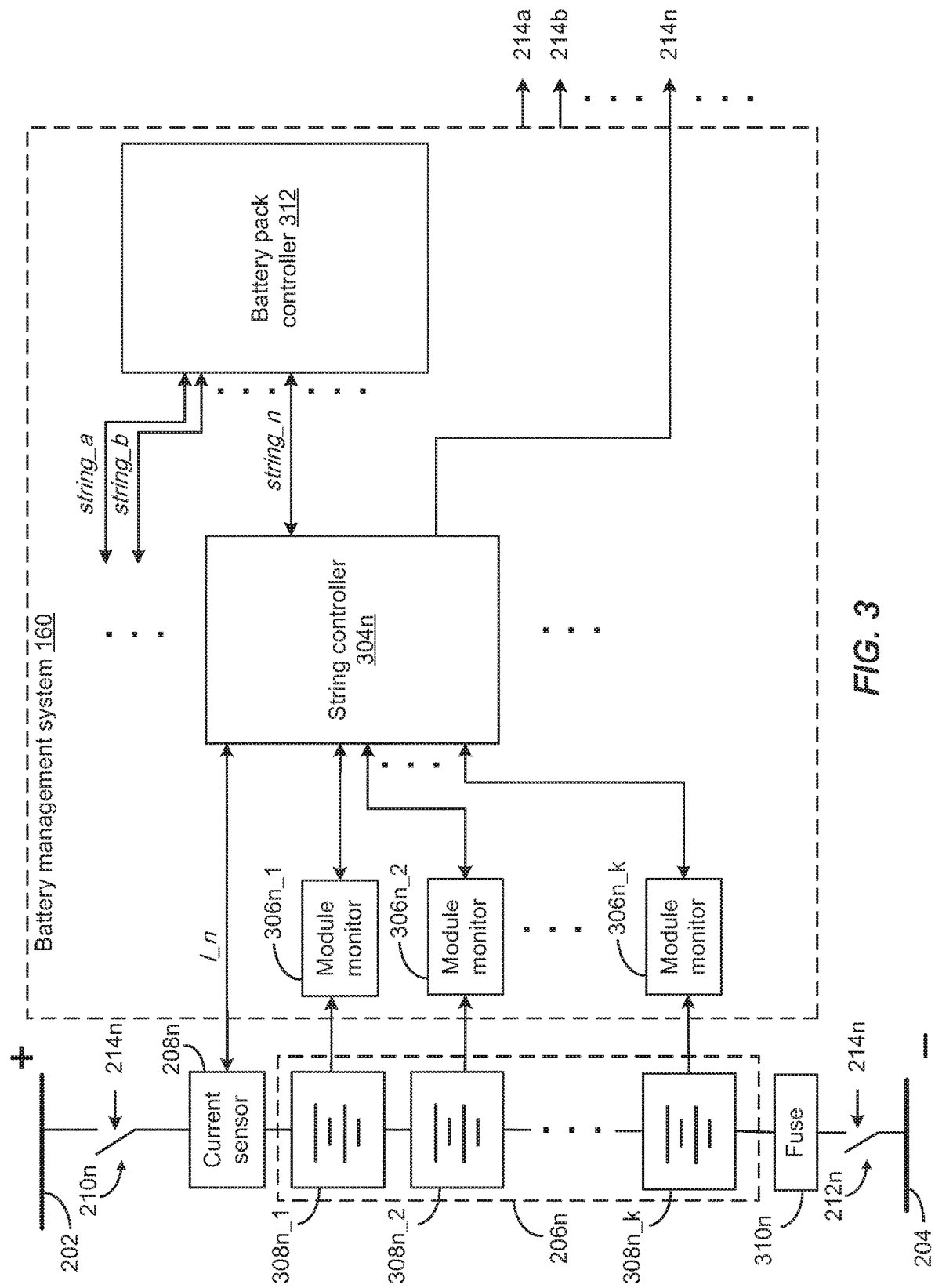
FIG. 3 is another block diagram of an example voltage source and battery management system according to one embodiment.

FIG. 3 is another block diagram of example voltage source and battery management system according to one embodiment. In FIG. 3, one exemplary battery string 206$n$ of the plurality of battery strings 206 of FIG. 2 is illustrated, and accordingly, the corresponding string current sensor 208$n$, string switches 210$n$, 212$n$, and control signal 214$n$ are illustrated. Also illustrated is a string fuse 310$n$ coupled to the battery string 206$n$, and although not illustrated, the battery strings 206$a$, 206$b$, . . . , 206$n$, . . . in FIG. 2 may each also have corresponding fuse 310$a$, 310$b$, . . . , 310$n$, . . . . The battery string 206$n$ includes a plurality of battery modules 308$n\_1$, 308$n\_2$, . . . , 308$n\_k$, individually or collectively referred to herein as the battery modules 308$n$ for the battery string 206$n$, each sending battery module telemetry data to respective module monitors 306$n\_1$, 306$n\_2$, . . . , 306$n\_k$, individually or collectively referred to herein as the module monitors 306$n$ for the battery string 206$n$, of the battery management system 160. The battery management system 160 includes a string controller 304$n$ for the battery string 206$n$ in communication with the battery modules 308$n\_1$, 308$n\_2$, . . . , 308$n\_k$ for the battery string 206$n$. The string controller 304$n$ can be implemented with one or more components and may include control circuit(s), processor(s), and/or transceiver(s) for receiving, processing, and/or sending data regarding the battery string 206$n$ and/or control signals (e.g., 214$n$) and communicating with other parts of the battery management system 160, such as a battery pack controller 312.

Although not illustrated, the battery management system 160 also may include respective string controllers 304$a$, 304$b$, . . . , 304$n$, . . . , individually or collectively referred to herein as the string controller(s) 304, for the plurality of battery strings 206$a$, 206$b$, . . . , 206$n$, . . . illustrated in FIG. 2. The battery management system 160 also includes the battery pack controller 312, which is in communication with the plurality of string controllers 304. The battery pack controller 312 can, for example, be implemented with one or more components, such as a processor or microcontroller. In some embodiments, the battery management system 160 can also include an analog-to-digital converter (ADC) internal or external to one or more controllers, such as one or more processors of the string controller 304 and/or the battery back controller 312, for processing analog data.

In the illustrated embodiment, the nth battery string 206$n$ has k number of battery modules 308$n$ and k number of module monitors 306$n\_1$, 306$n\_2$, . . . , 306$n\_k$. In some embodiments, one battery string 206 may include, for example 6 battery modules 308 in series. In some embodiments, one battery module 308 may include, for example, 16 battery bricks in series, and a battery brick may include 13 battery cells in parallel. Also, in some embodiments the voltage source 110 (FIG. 1) of the electric vehicle drive system 100 (FIG. 1) can include one battery pack, which includes, for example, 6 battery strings 206. A battery cell can be, for example, a Li-ion cell, and the battery pack for the electric vehicle drive system 100 can provide power greater than, for example, 500 kW.

The module monitors 306$n$ are configured to monitor status of the battery modules 308$n$ and the battery string 206$n$ by gathering data regarding voltage and temperature of the battery modules 308$n$. In the illustrated embodiment, the module monitors 306$n$ are in serial or point-to-point communication with the main controller 305$n$ of the string control unit 304$n$. In some embodiments, the module monitors 306$n$ can communicate with the main controller 305$n$ using one or more suitable communication protocols, such as CAN, SPI, universal synchronous asynchronous receiver transmitter (USART), universal asynchronous receiver transmitter (UART), etc. In other embodiments, the multiple subsidiary units (i.e., the module monitors 306$n$) can be in communication in a daisy-chained manner.

The battery pack controller 312 in the illustrated embodiment can be in communication with the plurality of string controller 304$a$, 304$b$, . . . , 304$n$, . . . . In some embodiments, various data from the one or more of the battery strings (e.g., string_a, string_b, . . . , string_n, . . . ) can be communicated using CAN bus and the battery management system 160 may include a plurality of CAN bus transceivers (not shown). The battery pack controller 312 can be in further communication with other devices, components, or modules of the electric vehicle. In certain instances, the battery pack controller 312 can communicate to components such as a switch driver, to cut power and disconnect all the switches 210 and 212, for example, in case of an air bag deployment.

Figure 4:
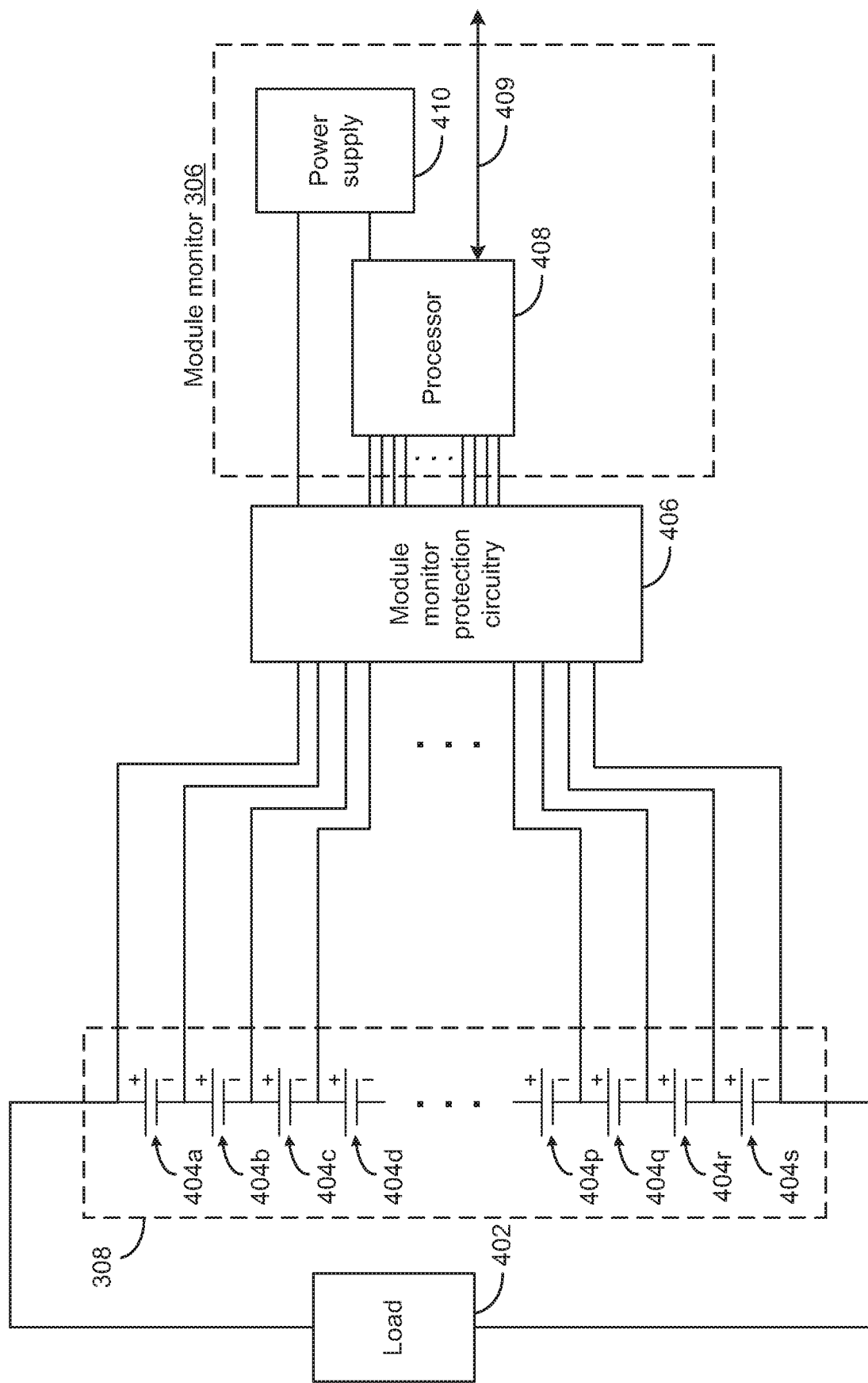
FIG. 4 is a block diagram of parts of the example voltage source and battery management system of FIG. 3.

FIG. 4 is a block diagram of parts of the example voltage source and battery management system of FIG. 3. In particular, FIG. 4 illustrates one representative battery module 308 (one of the battery modules 308$n\_1$, 308$n\_2$, . . . , 308$n\_k$ of FIG. 3, for example) and its associated module monitor 306 (one of the module monitors 306$n\_1$, 306$n\_2$, . . . , 306$n\_k$ of FIG. 3, for example), which includes a processor 408 in communication 409 with a string controller (e.g., 304$n$ in FIG. 3), and a power supply 410. As illustrated in FIG. 4, the battery module 308 includes multiple battery bricks or cells 404$a$, 404$b$, . . . , individually or collectively referred to herein as battery bricks or battery cells 404, connected in series. Also illustrated in FIG. 4 are load 402 connected to the battery module 308 and module monitor protection circuitry 406 connected between the battery module 308 and the module monitor 306.

Although the illustrated battery module 308 includes the battery bricks or cells 404$a$, 404$b$, 404$c$, 404$d$, . . . , 404$p$, 404$q$, 404$r$, 404$s$, the alphanumeric designations of the battery bricks or cells 404 do not denote any indication of the number of the battery bricks or cells 404. In some embodiments, the battery bricks or cells 404 can each be considered as a subunit within the battery module 308 that is connected in series with one another, regardless of whether one subunit 404 comprises one or more cells of battery connected in parallel. For example, in some implementations, the battery module 308 may include a plurality (e.g., 16) of battery bricks 404 connected in series, and each of the battery bricks 404 can include a plurality (e.g. 13) of battery cells connected in parallel. In other embodiments, the battery module 308 may include a plurality of battery cells 404 connected in series. It can be advantageous to monitor the battery status, such as voltage and current levels, of the battery bricks or cells 404 connected in series, and as further discussed below, the module monitor 306 can be configured to gather data from and between the nodes that are between one battery brick or cell 404 and another within the battery module 308.

Figure 5:
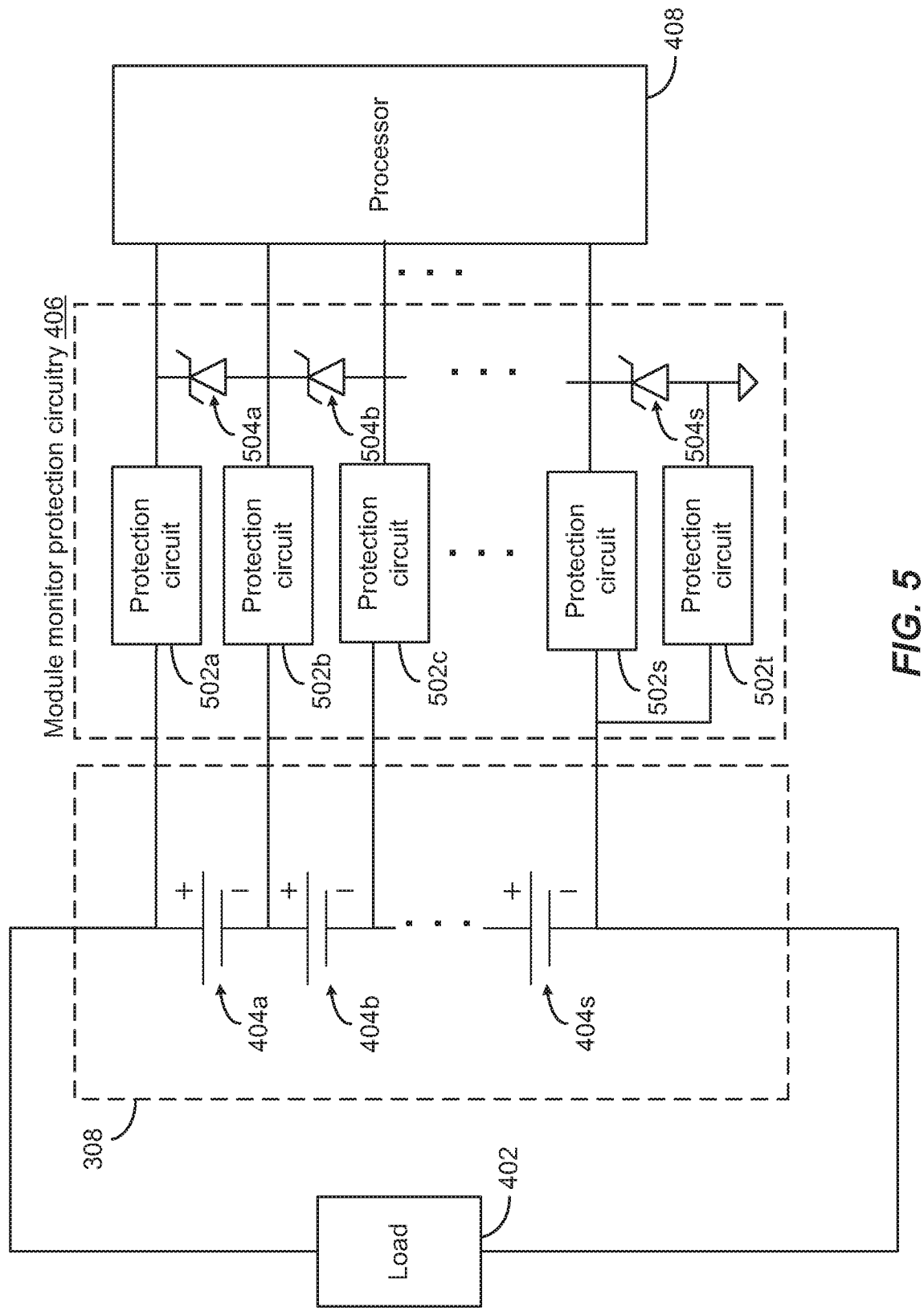
FIG. 5 is a block diagram of parts of the example voltage source and battery management system of FIGS. 3-4.
Figure 6:
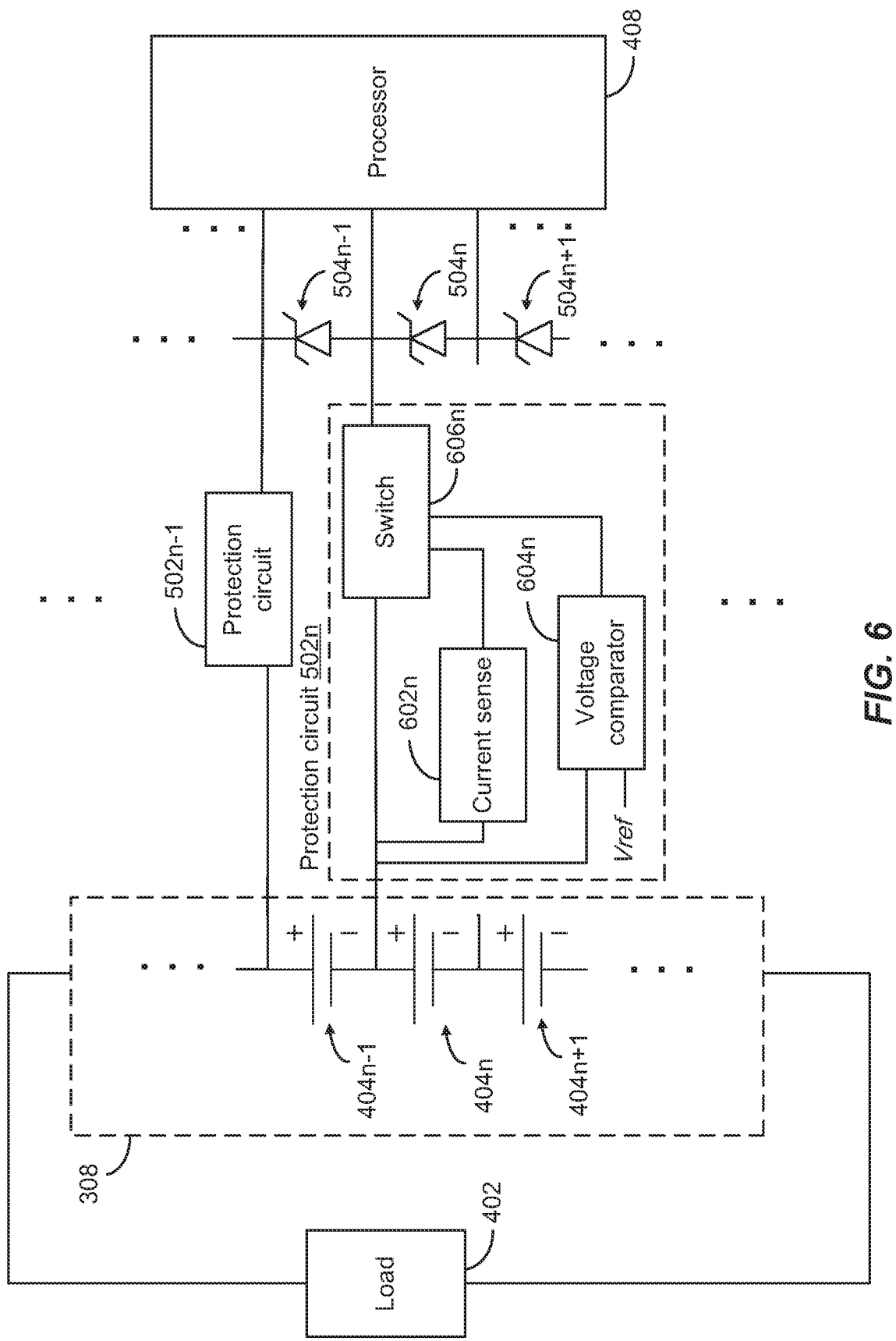
FIG. 6 is a block diagram of parts of the example voltage source and battery management system of FIGS. 3-5.

The load 402 illustrated in FIGS. 4-6 represents load having the impedance corresponding to that of the collective components electrically connected to the battery module 308, such as the remaining battery modules of the battery string 206, which are electrically connected to the bus bars 202, 204, which are connected to the drive load (i.e., invertor 120, motor 140, and mechanical load 105 of FIG. 1) of the electric vehicle drive system 100 (FIG. 1).

Although omitted in FIGS. 4-6, the battery module 308 can include fuses in between the battery bricks or cells 404. For example, there can be a fuse between the battery cells 404a and 404b, another fuse between the battery cells 404b and 404c, another fuse between the battery cells 404c and 404d, and so on. Connecting the battery cells 404 with fuses in series at strategic locations provides battery protection in case there is an unsuitably high level of current flowing through one or more of the battery cells 404. If, for example, the battery cell 404b becomes faulty causing a high current flow, a fuse (not shown) coupled to battery cell 404b can blow up to disconnect the faulty battery cell 404b from the remaining battery cells 404. This battery protection scheme with series fuses within the battery module 308, however, may present unique challenges with respect to the module monitor 306, which is configured to receive signals from and monitor various nodes (e.g. nodes in between the battery bricks or cells 404a, 404b, 404c, etc.) within the battery module 308.

It can be advantageous to implement the module monitor protection circuitry 406 between the nodes within the battery module 308 and the module monitor 306 including the processor 408 as disclosed herein. As illustrated in FIG. 4-6, the module monitor 306 is configured to monitor multiple battery cells 404a, 404b, 404c, . . . , 404n−1, 404n, 404n+1, etc. through the nodes in between the battery cells 404a, 404b, 404c, . . . , 404n−1, 404n, 404n+1, etc., for example. Continuing with the example discussed above, if the fuse associated with the battery cell 404b blows up, the battery cell 404b would be disconnected from the battery cells 404a and 404c. However, without the module monitor protection circuitry 406 implemented in between the battery module 308 and the module monitor 306, the open circuit created by the faulty battery cell 404b (e.g., the blown fuse) could redirect the current from the battery cell 404a through the module monitor 306 to the battery cell 404c, thus, completing a circuit. It is to be noted that the module monitor protection circuitry 406 can be understood as being part of or embedded within the module monitor 306.

Depending on the load 402 connected to the battery module 308, a direct coupling of the multiple nodes within the battery module 308 with the processor 408, or any other similar integrated circuit (IC) elements within the module monitor 306, can present various challenges, such as cell inversion caused by discharging the cell or overvoltage transients caused by charging or regeneration from the load 402. For example, in the absence of the module monitor protection circuitry 406, if a battery cell (e.g., 404b) is at fault and disconnected and the load 402 is relatively light and, the module monitor 306 can be exposed to low undervoltage or negative transients. In another example, in the absence of the module monitor protection circuitry 406, if a battery cell (e.g., 404b) is at fault and disconnected and the load 402 is relative heavy, the module monitor 306 can be exposed to high undervoltage or complete cell inversion. In another example, in the absence of the module monitor protection circuitry 406, if a battery cell (e.g., 404b) is at fault and disconnected and the load 402 creates a regenerative current flow, the module monitor 306 can be exposed to overvoltage transients. In these examples, if the module monitor protection circuitry 406 is absent, positive and/or negative transients can flow through the module monitor 306, causing the devices within the module monitor 306 to, for example, latch up, draw excessive current from the battery cells 404, and allow the temperature of the cells 404 to rise causing a hazardous condition (e.g., fire). Further details of the module monitor protection circuitry 406 are discussed in connection with FIGS. 5-6 below.

FIG. 5 is a block diagram of parts of the example voltage source and battery management system of FIGS. 3-4. In particular, FIG. 5 illustrates an example of the module monitor 306 including protection circuits 502a, 502b, . . . , individually or collectively referred to herein as protection circuit(s) 502, and Zener diodes 504a, 504b, . . . , individually or collectively referred to herein as Zener diode(s) 504, for the respective battery bricks or cells 404. Similar to the battery bricks or cells 404 discussed above, although the illustrated module monitor protection circuitry 406 includes the protection circuits 502a, 502b, 502c, . . . , 502s, 502t and the Zener diodes 504a, 504b, . . . , 504s, the alphanumeric designations of the protection circuits 502 and the Zener diodes 504 do not denote any indication of the number of the protection circuits 502 or the Zener diodes 504.

The protection circuits 502 in the module monitor protection circuitry 406 advantageously provide individualized node by node protection between the processor 408 and the multiple nodes within the battery module 308 of the battery cells 404 connected in series. For example, if the battery cell 404b becomes faulty and the fuse (not shown) coupled to the battery cell 404b blows to disconnect the battery cell 404b from the rest of the battery module 308, the protection circuits 502b and 502c and the Zener diode 504b can be configured to provide protection to the processor 408 so that undesirable under- or over-voltage transients would not be experienced at the processor 408. Similarly, if one or more nodes within the battery module 308 should be connected to the power supply 410 (FIG. 4), protection elements similar to the protection circuit 502 and/or Zener diode 504 can be employed between the nodes within the battery module 308 and the power supply 410. It is to be noted that although the module monitor protection circuitry 406 illustrated in FIG. 5 shows protection of the processor 408, other IC elements of the module monitor 306 (FIG. 4) that are coupled to one or more nodes of the battery module 308 can be similarly protected by the module monitor protection circuitry 406. Further details of the protection circuits 502 are discussed in connection with FIG. 6 below.

FIG. 6 is a block diagram of parts of the example voltage source and battery management system of FIGS. 3-5. In particular, FIG. 6 illustrates an example protection circuit 502n, which is one of the protection circuits 502 in FIG. 5. The illustrated protection circuit 502n includes a current sense element 602n, a voltage comparator 604n, and a switch 606n. Using the current sense circuit element 602n and the voltage comparator 604n, the protection circuit 502n can determine an undesirable level of transients (large voltages or currents) that may affect the processor 408. Based on the sensed level of current and voltage, the switch 606n can be turned to provide a barrier between the one or more internal nodes of the battery module 308 and the processor 408, for example.

The various constituent elements of the protection circuit 502, can be based on semiconductor technology, such as metal oxide semiconductor field effect transistor (MOSFET) technology. The current sense element 602n can be implemented with one or more current sensors or circuits, such as Hall-effect sensors, magnetoresistive sensors, and/or semiconductor based detection circuits, and the voltage comparator 604n can be implemented with an amplifier, such as an operational amplifier, and can be configured to receive a reference voltage, Vref, which can be ground. The switch 606n can be implemented with a high voltage switch using suitable semiconductor technology. Advantageously, the module monitor protection circuitry 406 as disclosed herein provides brick-by-brick, cell-by-cell or node-by-node protection between various internal points within the battery module 308 and various elements of the module monitor 306 (FIG. 3-4), which resides in the hierarchical battery management system 160 (FIG. 3).

In some embodiments, the module protection circuitry 406, including the protection circuits 502, disclosed herein can be implemented with various active and/or passive circuit elements. In some embodiments, each of the protection circuits 502 can be implemented with a commercially available standalone unit configured to provide high-speed transient protection, such as Bourns® TBU® (Transient Blocking Unit). In some embodiments, the diodes disclosed herein can be implemented with rectifiers or diodes, such as P-N junction diodes, Schottky barrier diodes, GaAs diodes, semiconductor diodes, or the like. In some embodiments, the circuit elements disclosed herein can be implemented with field effect transistors (FETs), such as metal oxide semiconductor (MOS) transistors, which can be in complementary form, junction field effect transistors (JFETs), laterally diffused metal oxide semiconductor (LDMOS) transistors, GaAs metal semiconductor field effect transistors (GaAs MESFETs), pseudomorphic high electron mobility transistors (pHEMTs), or the like. While the terms "metal" and "oxide" may be present in for example, MOS, such transistors can have gates made out of materials other than metals, such as polysilicon, and have dielectric oxide regions made from dielectrics other than silicon oxide, such as a high-κ dielectric. According to some other embodiments, circuit elements implemented in accordance with the principles and advantages discussed herein can be with bipolar transistors, such as SiGe bipolar transistors or GaAs heterojunction bipolar transistors. According to certain embodiments, one or more elements of the protection circuit 502 can be implemented on the same die.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the Figures depict example arrangements of elements and components, additional intervening elements, devices, features, or components may be present in an actual embodiment (assuming that the functionality of the depicted circuits is not adversely affected).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the implementations are not limited to the precise configuration and components illustrated above. Various modifications, changes and variations may be made in the arrangement, operation and details of the methods and apparatus described above without departing from the scope of the implementations.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well.

What is claimed is:

1. A battery system of an electric vehicle comprising:
   at least a first battery string comprising a plurality of battery modules, wherein the first battery string has an output that is coupled to a power bus through a string switch, and wherein each of the plurality of battery modules comprises a plurality of battery cells connected in series;
   a plurality of battery module monitors, wherein each of the plurality of battery module monitors is coupled to the plurality of battery cells of a corresponding one of the plurality of battery modules; and
   individual module monitor protection circuitry coupled to each battery module monitor of the plurality of battery module monitors, wherein the module monitor protection circuitry for each battery module monitor comprises a plurality of protection circuits, each of the plurality of protection circuits configured to disconnect the corresponding battery module monitor from a corresponding node between two of the plurality of battery cells.

2. The battery system of claim 1, wherein each of the plurality of protection circuits comprises a cell switch configured to disconnect a corresponding battery cell from the corresponding module monitor.

3. The battery system of claim 1, further comprising a string current sensor connected in series with the first battery string, the string current sensor configured to measure the current discharged from the first battery string.

4. The battery system of claim 1, wherein each of the plurality of battery module monitors is configured to receive battery module telemetry data from the corresponding one of the plurality of battery modules.

5. The battery system of claim 1, wherein each of the battery module monitors is configured to monitor status of at least the corresponding one of the plurality of battery modules by gathering data comprising voltage and temperature data of the battery module.

6. The battery system of claim 1, further comprising a main controller of the first battery string, the main controller in communication with the plurality of battery module monitors.

7. The battery system of claim 6, further comprising a battery pack controller configured to communicate with the main controller and cut power from the battery system to the power bus in response to information received from the main controller.

8. The battery system of claim 1, further comprising a load connected to at least one of the modules and its corresponding module monitor protection circuitry.

9. The battery system of claim 8, wherein the load has an impedance corresponding to that of collective components electrically connected to the at least one of the battery modules.

10. The battery system of claim 1, further comprising, in each battery module, at least a fuse between two of the plurality of battery cells.

11. The battery system of claim 10, wherein the fuse is configured to be blown up in response to a high level of current flowing through the two of the plurality of battery cells.

12. The battery system of claim 1, wherein each of the battery module monitors further comprises a processor and wherein the module monitor protection circuitry is configured to provide protection between the processor of a battery module monitor and a plurality of nodes within one of the battery modules.

13. The battery system of claim 12, wherein the module monitor protection circuitry further comprises a plurality of diodes.

* * * * *

UNITED STATES PATENT AND TRADEMARK OFFICE
CERTIFICATE OF CORRECTION

PATENT NO. : 11,201,378 B2  
APPLICATION NO. : 16/099645  
DATED : December 14, 2021  
INVENTOR(S) : Huynh et al.

Page 1 of 1

It is certified that error appears in the above-identified patent and that said Letters Patent is hereby corrected as shown below:

On the Title Page

Column 1, Line 1, under item (73) Assignee, delete "Faraday & Future" and insert --Faraday&Future--.

In the Claims

In Column 12, Claim 8, Line 5, after "the" insert --battery--.

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*